(12) United States Patent
Lowery

(10) Patent No.: US 10,095,546 B2
(45) Date of Patent: *Oct. 9, 2018

(54) BATCH PROCESSING OF OVERSUBSCRIBED SYSTEM BASED ON SUBSCRIBER USAGE PATTERNS

(71) Applicant: Flexera Software LLC, Itasca, IL (US)

(72) Inventor: Robert Lowery, Melbourne (AU)

(73) Assignee: Flexera Software LLC, Itasca, IL (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/096,125

(22) Filed: Apr. 11, 2016

(65) Prior Publication Data

US 2017/0097849 A1    Apr. 6, 2017

Related U.S. Application Data

(63) Continuation of application No. 14/726,269, filed on May 29, 2015, now Pat. No. 9,311,139.

(51) Int. Cl.
*G06F 9/48* (2006.01)
*G06F 17/30* (2006.01)
*G06F 9/46* (2006.01)

(52) U.S. Cl.
CPC ...... *G06F 9/4887* (2013.01); *G06F 17/30563* (2013.01)

(58) Field of Classification Search
CPC . G06F 17/30563; G06F 9/4843; G06F 9/4881
USPC ........................................................ 718/101
See application file for complete search history.

(56) References Cited

U.S. PATENT DOCUMENTS

| | | | | |
|---|---|---|---|---|
| 5,844,980 A * | 12/1998 | Patel | ...................... | G06F 9/4881 340/286.06 |
| 6,662,203 B1 * | 12/2003 | Kling | .................... | G06F 9/4881 709/207 |
| 6,996,821 B1 * | 2/2006 | Butterworth | .......... | G06F 8/4442 711/100 |
| 8,924,981 B1 * | 12/2014 | Brown | .................. | G06F 9/4881 707/713 |

OTHER PUBLICATIONS

Chun et al., "User-centric Performance Analysis of Market-based Cluster Batch Schedulers," IEEE, 2002, 9pg.*

(Continued)

*Primary Examiner* — Ryan D Coyer
(74) *Attorney, Agent, or Firm* — Michael A. Glenn; Perkins Coie LLP

(57) ABSTRACT

Some embodiments include a method of scheduling batch processing of a batch processing system based on subscriber usage patterns. The method includes steps of recording a last job commencement event for a subscriber when the batch processing system starts processing a batch process for the subscriber; recording a last usage event for the subscriber when the subscriber uses the batch processing system; in an event that a time period elapsed since the last usage event for the subscriber is less than a time period elapsed since the last job commencement event for the subscriber, placing a next batch process of the subscriber into a recently used queue; identifying the next batch process of the subscriber as the oldest batch process from the recently used queue; and start processing the identified batch process for the subscriber.

22 Claims, 5 Drawing Sheets

(56) References Cited

OTHER PUBLICATIONS

Etison et al., "A Short Survey of Commercial Cluster Batch Schedulers," The Hebrew University, 2005, 4pg.*
"N1 Grid Engine 6 Administration Guide," published in May 2005 by Sun Microsystems, Inc., 220pg.*
Zaharia et al., "Job Scheduling for Multi-User MapReduce Clusters," University of California, Berkeley, Apr. 2009, 18pg.*
"N1 Grid Engine 6 Administration Guide", Sun Microsystems, Part No. 817-5677-20, May 2005, 220 pages.
Chun, et al., "User-centric Performance Analysis of Market-based Cluster Batch Schedulers", Proc. of the 2nd IEEE/ACM Int'l Symposium on Cluster Computing and the Grid, May 2002, pp. 1-9.
Etsion, et al., "A Short Survey of commercial Cluster Batch Schedulers", The Hebrew University, 2005, pp. 1-4.
Zaharia, et al., "Job Scheduling for Multi-User MapReduce Clusters", Electrical Engineering and Computer Sciences University of California at Berkeley; Technical Report No. UCB/EECS-2009-55, Apr. 30, 2009, 18 pages.

* cited by examiner

BATCH PROCESSING OF OVERSUBSCRIBED SYSTEM BASED ON SUBSCRIBER USAGE PATTERNS

CROSS-REFERENCE TO RELATED APPLICATIONS

This application is a continuation of U.S. patent application Ser. No. 14/726,269, filed May 29, 2015, which is incorporated herein in its entirety by this reference thereto.

RELATED FIELD

At least one embodiment of this disclosure relates generally to batch processing scheduling, and in particular, methods and systems to schedule batch processing of oversubscribed systems based on subscriber usage patterns.

BACKGROUND

There is an increasing demand for automatic scheduling of batch processing tasks. In particular, users of online services (e.g., cloud-based services or applications) can submit large amounts of requests every day to the servers of the online services. The online services generally offer levels of service including soft or hard guarantees on when to finish the users' tasks and to provide results to the users. However, with an increasing number of subscribers signing up for an online service, the current computational capacity of the online service may not be able to handle the submitted tasks within a planned time frame. In other words, due to the cost control or system scalability limits, the demands of the batch processing tasks exceed the available capacity of the service.

SUMMARY

To alleviate the discrepancy between the capacity limitation of batch processing system and the increasing demand of batch processing tasks, the disclosure provides a batch scheduling method to prioritize batch processing based on subscriber usage patterns. The goal of the scheduling method is to achieve soft guarantees for returning the processed results, at least for some subscribers, where hard guarantees of finishing the batch processing are not mandated.

Subscribers of the batch processing system (also referred to as "users") can have various usage patterns. One subscriber may use the batch processing system on an hourly or daily basis; while another subscriber may use the batch processing system once in a week or even a month. Active subscribers with frequent usage patterns are more likely to be negatively affected by delayed batch processing. On the other hand, the inactive subscribers with infrequent usage patterns likely do not notice the delays. Therefore, the batch processing system can prioritize the batch processing for the active subscribers without actual negative consequence to the inactive subscribers.

The batch processing system can implement multiple priority queues, such as an overdue queue, a recently used queue, and a low priority queue. The overdue queue includes overdue batch processes that need immediate attention from the batch processing system. A batch process for a subscriber is determined to be overdue when the time elapsed since the last batch process commencement for the subscriber is more than an adjusted overdue threshold. The adjusted overdue threshold depends on a total time taken by the batch processing system to complete all batch processes of the last cycle, and a limit factor determining how far batch processes in the overdue queue are allowed to lapse before being processed.

If the overdue queue is empty, the batch processing system starts processing the batch processes in the recently used queue. The recently used queue includes batch processes for subscribers who have recently used the batch processing system. The usage event is recorded when the subscriber interacts with the batch processing system via a user interface provided by the batch processing system, or when a background usage for the subscriber happens, e.g., generating report on the background or making application programming interface (API) calls provided by the batch processing system. A batch process for a subscriber is moved into the recently used queue when the time period elapsed since the last usage by the subscriber is less than the time period elapsed since the last batch process commencement for the subscriber. In other words, a batch process is determined to be in the recently used queue if the subscriber of the batch process has recently used the batch processing system after the system started processing the last batch process for the subscriber.

If the overdue queue and the recently used queue are empty, the batch processing system starts processing batch processes from a low priority queue. The low priority queue includes batch processes that are not given priority for processing. In some embodiments, the subscribers can also request the batch processing system to expedite their batch processes. In response to the requests, the batch processing system moves the requested batch processes into an expedite queue. The batch processing system may first execute the batch processes in the expedite queue before handling other batch processes from the overdue queue, the recently used queue and the low priority queue.

Such a scheduling method is particular useful for an oversubscribed system. Since many subscribers are inactive users who do not need to access the processed result frequently, prioritizing the order in which batch processes are performed based on user usage allows the batch processing system to meet the desired result-update frequency for the active subscribers that have been frequently using the batch processing system.

Some embodiments of this disclosure have other aspects, elements, features, and steps in addition to or in place of what is described above. These potential additions and replacements are described throughout the rest of the specification

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
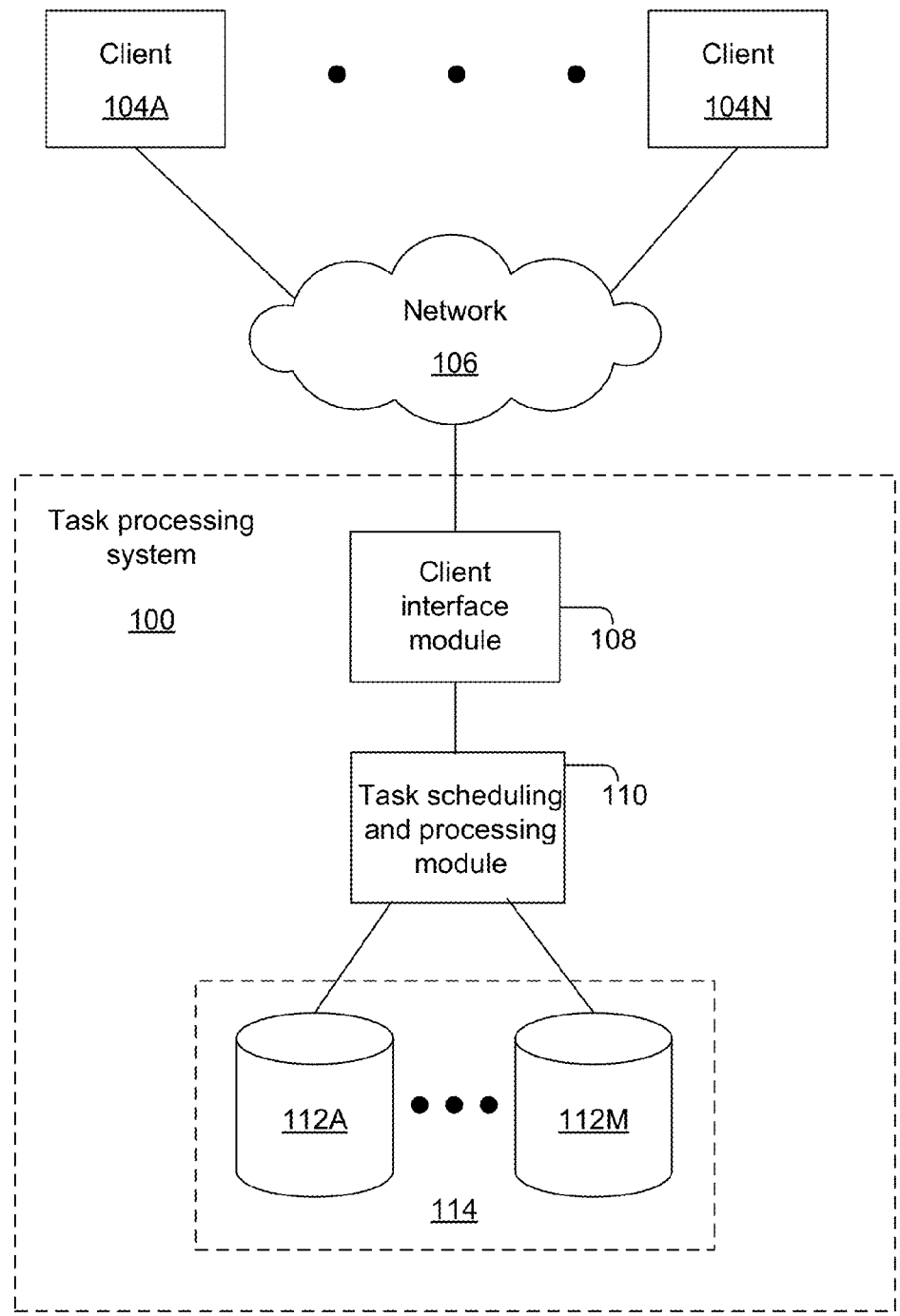
FIG. 1 is a block diagram of a system architecture of a task processing system 100, in accordance with various embodiments.

FIG. 1 is a block diagram of a system architecture of a task processing system 100, in accordance with various embodiments. The task processing system 100 (also referred to simply "system") interacts with multiple client computing devices or systems 104A—104N via a network 106. As illustrated in FIG. 1, the task processing system 100 includes at least one client interface module 108, a task scheduling and processing module 110, and one or more mass storage devices 112A-112M, e.g., conventional magnetic disks, optical disks (e.g. CD-ROM or DVD based storage), magneto-optical (MO) storage, flash memory storage device or any other type of non-volatile storage devices suitable for storing structured or unstructured data. The mass storage devices 112A-112M may be associated with a mass storage subsystem 114.

The client systems 104A-104N may access the client interface module 108 via network 106, which can be a packet-switched network, for example, a local area network (LAN), a wide area network (WAN), the Internet, or any other type of network.

The client interface module 108 can make some or all of computational capacity of the task scheduling and processing module 110 available to the client systems 104A-104N. Similarly, the client interface module 108 can make some or all of the storage space on the mass storage devices 112A-112M available to the client systems 104A-104N. The client interface module 108 can communicate with the client systems 104A-104N according to well-known protocols, e.g., the Hypertext Transfer Protocol (HTTP).

The client interface module 108 can present or export task results to the client systems 104A-104N through the NetApp 106 in various ways. For example, the client interface module 108 can host a HTTP (Hypertext Transfer Protocol) web server. The client systems 104A-104N can use web browser applications to review or retrieve task results by accessing web pages hosted on the HTTP web server.

In various embodiments, the task processing system 100 can be a batch processing system that regularly performs extract, transform and load (ETL) batch processing. The ETL batch processing task can take a significant amount of time and resources to complete. One example of such ETL batch processing system is a server or cloud-based service that running FlexNet Manager Suite. (FlexNet Manager is a trademark of Flexera Software LLC.) The FlexNet Manager Suite is a solution for hardware and software assets management as well as software license compliance and optimization. Enterprise customers use the FlexNet Manager Suite to track the software and hardware assets within customers' organizations, and monitor their license consumption. The FlexNet Manager Suite can provide information regarding what license rights a customer is entitled to and what license rights the customer is actually using to support the client's organization.

In order to collect and analyze the information about the assets and licenses, the FlexNet Manager Suite collects information about each device that is in a customer's organization, data that relate to the hardware of the device, data that relate to the software running on top of the device hardware. Such an ETL processing task involves extracting the information from different sources, transforming the extracted information (e.g., normalizing the information into a common format), and then loading the transformed information into the system.

Figure 2:
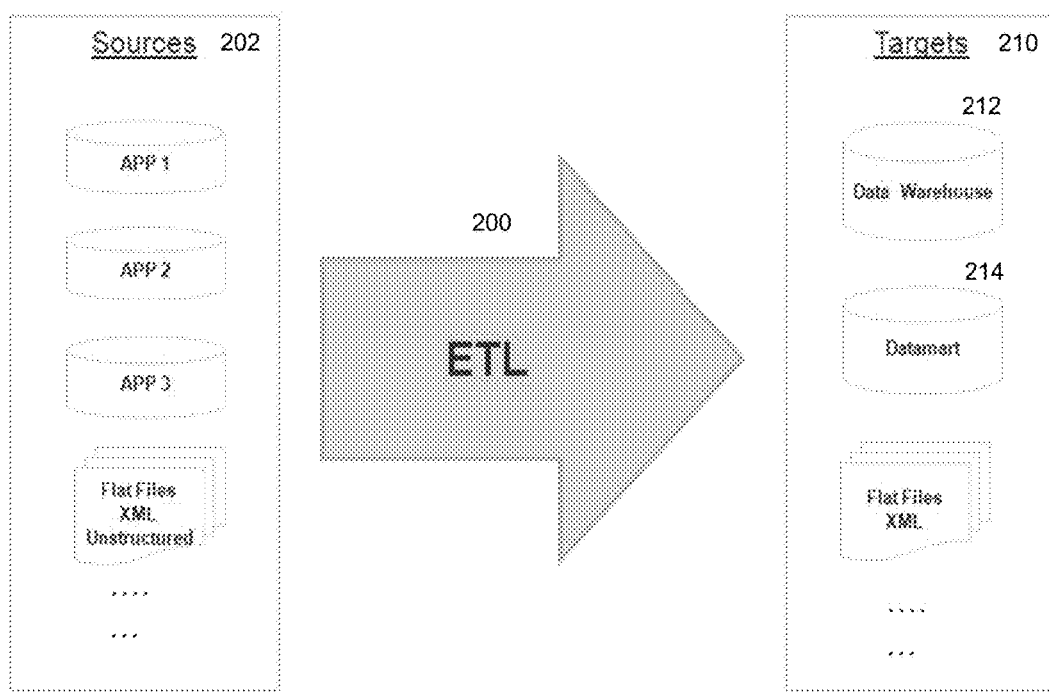
FIG. 2 is a block diagram illustrating an example extract, transform and load (ETL) process, in accordance with various embodiments.

FIG. 2 is a block diagram illustrating an example extract, transform and load (ETL) process, in accordance with various embodiments. In FIG. 2, the ETL process 200 loads data from source systems 202 into targets 210 such as data warehouses (DWH) 212 or data marts (DM) 214. Such a ETL process can also be used in data integration, data migration and master data management situations.

In order to facilitate the data movement and transformation, the ETL process 200 in FIG. 2 first extracts data from one or more sources 202 as illustrated in FIG. 2. Then the ETL process transforms the data by, e.g., cleansing, reformatting, standardization, aggregation, or applying business rules. The ETL process loads the resulting data set into specific target systems. The ETL process may support massive parallel processing for large data volumes and is a reusable component that can be scheduled to perform data movement and processing jobs on a regular basis. Typically the ETL process is used for data movement across or within systems involving high data volumes and complex business rules, such as bulk data integration, flat-file based and hierarchical transformations or high scale, batch-oriented data delivery. Multiple ETL processes can be grouped and executed together.

For example, the FlexNet Manager Suite performs the ETL processes on a daily basis as batch processes. The users of the FlexNet Manager Suite interact with result data by using a web browser to access a web server interface of the FlexNet Manager Suite. With an increasing number of service subscribers (e.g., tenants), especially when the system is implemented as a cloud-based service, the system may have problems to handle all of the batch processing that ideally should be finished within a desired time frame. For example, a cloud-based FlexNet Manager Suite may desire to complete all batch processes every 24 hours for all subscribers. However, due to the current task load and computational capacity limits, the batch processes to extract, transform and load for all subscribers may take more than 40 hours to finish.

To handle the discrepancy between the capacity limitation and the need of batch processing, the system uses a scheduling method to prioritize batch processing based on subscriber usage patterns to achieve a soft guarantee where hard guarantees are not mandated.

Subscribers of a system may have different usage patterns across the full spectrum of hourly, daily, weekly, or monthly time frames. Subscribers with frequent usage are more likely to be negatively affected by delayed batch processing; whereas for infrequent users, delays are likely to be unnoticed without actual negative consequence. For example, some subscribers of FlexNet Manger may not use the system every single day. So prioritizing the order in which batch processes are performed based on usage will allow the system to meet the desired 24 hour update for the subscribers that have been actively using FlexNet Manager Suite.

Usage of the system includes, e.g., interactive use of the service via a web browser user interface (UI). However, the usage may also include scheduled background tasks, such as generating report at the background or making application programming interface (API) calls that are provided by the service.

Figure 3:
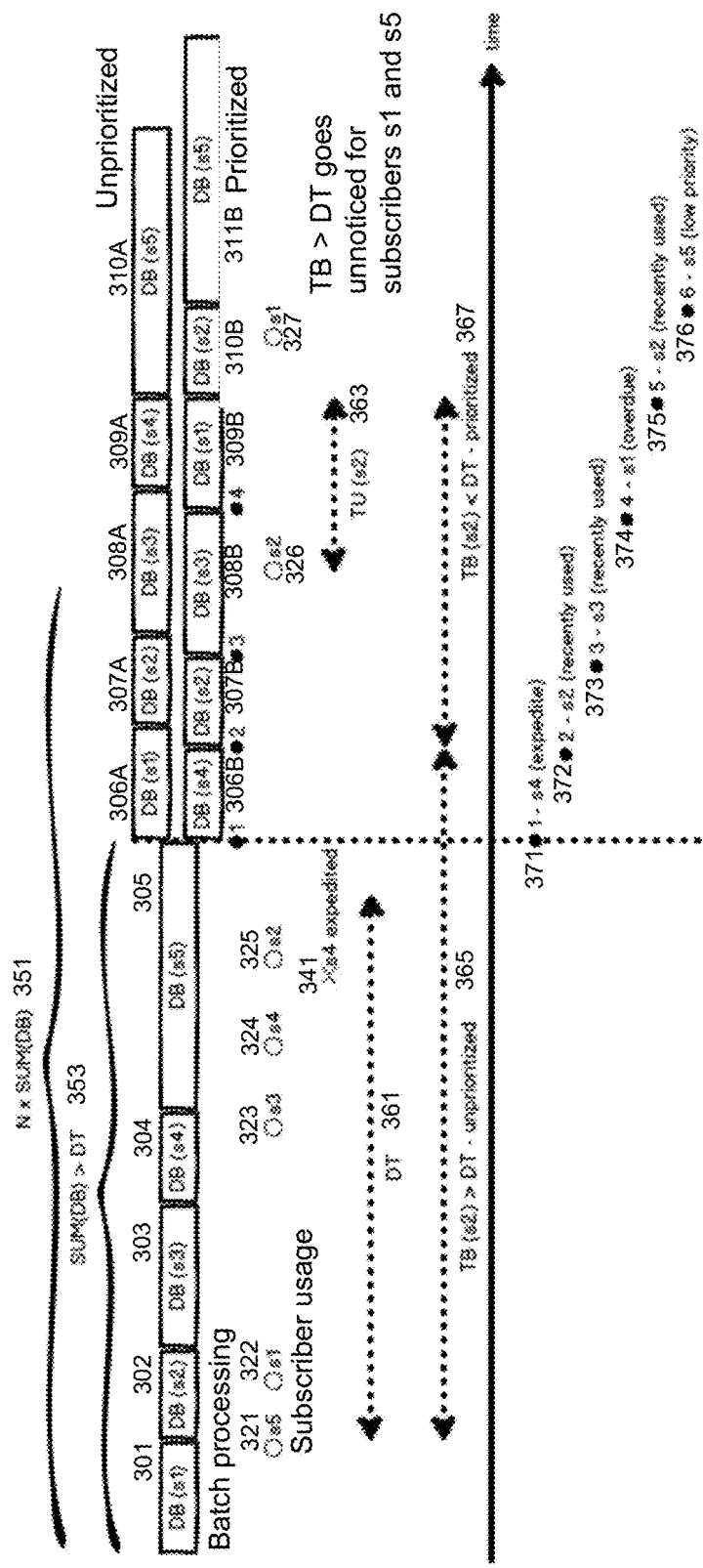
FIG. 3 is a block diagram of an example of a batch execution prioritization process, in accordance with various embodiments.

FIG. 3 is a block diagram of an example of batch execution prioritization, in accordance with various embodiments. To facilitate the prioritization of batch processing, the system records various metrics for each subscriber. For example, the system records a metric DB as a time duration of the last batch processing for a subscriber. A metric TB is a time elapsed since the last batch process commencement for a subscriber. A metric TU is a time elapsed since the last usage by a subscriber.

DT is a desired maximum time since the last batch process commencement for a subscriber. In some embodiments, the system specifies the metric DT for all subscribers. For example, the FlexNet Manager Suite may specify the metric DT for all subscribers as 24 hours. In other words, the FlexNet Manager Suite specifies the desired maximum time for each individual subscriber since the last batch process commencement for that individual subscriber is 24 hours. DT is a goal (also referred to as "soft target") that the system prefers to achieve for as many subscribers as possible. The prioritization of batch processes ensures that most of the subscribers, especially the active or frequent subscribers, can have their batch processes finished within the time frame of DT.

In some embodiments, the metric DT remain as a constant. In some other embodiments, the system or the subscribers can change the value of DT during the scheduling.

By the definition of the metric TB, the goal that the system tries to achieve is to keep the metric TB to be less than the time DT. In other words, it is ideal for a subscriber if the time elapsed since the last batch process commencement for the subscriber is less than the desired maximum time since the last batch process commencement for the subscriber. However, for an oversubscribed system with a large amount of active subscribers, the total processing cycle time taken to complete all pending batch processing in a time cycle is going to be more than DT: SUM (DB)>DT. In some embodiments, the total time in one time cycle is not a literal sum since batch processing can occur in parallel based on server capability.

In some embodiments where the system can process multiple batch processes simultaneously (i.e., in parallel), the metric SUM(DB) can have a slightly different meaning. In those situations, the metric SUM(DB) may not be the literal summation of all metrics DB of the batch processes from the last cycle. The metric SUM(DB) can be the time from the commencement of the first batch process of the last cycle, till the end of the last batch process of the last cycle, regardless of whether there are batch processes running in parallel. If the system is able to get every batch processed done within the desired time frame because the system's server(s) have enough parallel processing power, then the system may not need the priority scheduling since there is no danger of overdue. Therefore, it is enough to record the actual total time for completing the batch processes of the last cycle as SUM(DB).

The metric N is a limit factor determining how far overdue batch processes are allowed to go before being given priority for processing. The metric N is used to ensure that the batch processes are eventually performed even in the absence of recent subscriber usage of the system. In some embodiments, N is specified to be larger than 1.0 for the scheduling method to be effective.

Larger values for the metric N will lead to improved responsiveness for active subscribers, who recently have used the system, at the expense of responsiveness for inactive subscribes without recent usage. However, an N factor with a too large value will lead to starvation, meaning the batch processes will wait for a long time before they will be identified as being overdue. In that scenario, the system effectively has no priority control over the batch processes. If the N factor has a value that is too small, the system has not opened up enough of a time window to be able to fit in enough subscribers that have recently used the system.

In some embodiments, the N factor is a constant that the system determines for all subscribers. In some other embodiments, the subscribers can specify the N factor for each individual subscriber. Alternatively, the N factor can be adjusted as a way to adjust the levels of service for different subscribers.

In FIG. 3, the horizontal axis represents the time dimension. The rectangles 301-305, 306A-310A and 306B-311B represent the batch processes and the horizontal lengths of the rectangles 301-305, 306A-310A and 306B-311B represent the time lengths used for the system to perform the corresponding batch processes respectively. For example the first rectangle 301 is a batch process request by subscriber s1; the horizontal length of the rectangle 301 represents the value of metric DB(s1).

The horizontal positions of the white dots 321-327 represent the time points when the subscribers use the system (by interactive usage or background usage). For example, the white dot 321 indicates that subscriber s5 uses the system at the end of a time period when the system processes the batch process 301. Similarly, the white dot 325 indicates that subscriber s2 uses the system at the middle of a time period when the system processes the batch process 305.

The horizontal position of the cross 341 presents the time point when the subscriber s4 requests to expedite the batch process of subscriber s4.

The dotted line 361 represents a time period of the desired maximum time metric DT. The downward gull brace 353 represents a time period of a total processing cycle time SUM(DB). For the scenario without parallel processing, as illustrated in FIG. 3, SUM(DB)=DB(s1)+DB(s2)+DB(s3)+DB(s4)+DB(s5). Since the system is oversubscribed, SUM (DB)>DT. As shown in FIG. 3, the downward gull brace 353 representing SUM(DB) is longer in time dimension than the dotted line 361 representing DT.

The downward gull brace 351 represents an adjusted overdue threshold. The adjusted overdue threshold equals the total processing cycle time SUM(DB) times the limit factor N: N×SUM (DB). Since usually the value of N is larger than 1.0, the downward gull brace 351 is longer than the downward gull brace 363 in time dimension.

The horizontal positions of the black dots 371-376 represent each time point when the system triggers a batch scheduler to make a scheduling decision based on four priority queues. The batch scheduler is illustrated in FIG. 4.

Figure 4:
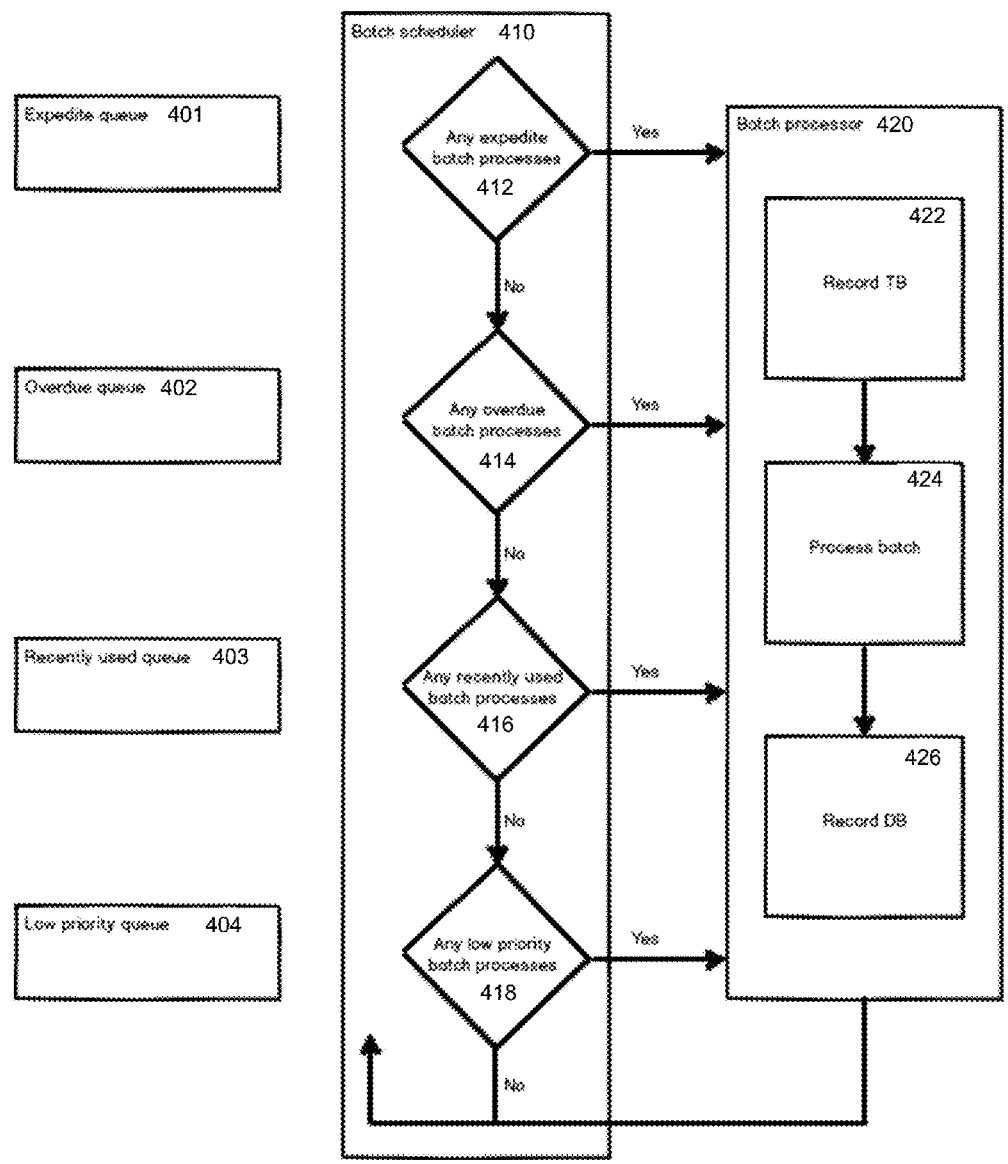
FIG. 4 is a block diagram of four priority queues for scheduling batch processes, in accordance with various embodiments.

FIG. 4 is a block diagram of four priority queues for scheduling batch processes, in accordance with various embodiments. In FIG. 4, the batch processes requested by subscribers are kept in multiple priority queues. The system executes lower priority queues only if higher priority queues are empty. Within each queue, the system first executes the oldest batch process left in that queue.

In the embodiment as illustrated in FIG. 4, the system schedules the batch processing using four priority queues. The first priority queue (i.e., the queue has the highest priority) is the expedite queue 401. A subscriber of the system can specifically request, e.g. via a web browser user interface, a particular batch process to be expedited. Accordingly, the system places the requested batch process in the expedite queue 401. The batch processes in the expedite queue will be handled with top priority.

The queue having the second highest priority is the overdue queue 402. The overdue queue includes overdue batch processes. A batch process for a subscriber is overdue if the metric TB for the subscriber is larger than the total processing cycle time SUM (DB) times the limit factor N: TB>N×SUM (DB). The N×SUM(DB) is an adjusted overdue threshold. Once the threshold is passed, the batch process is highlighted by being moved into the overdue queue 402. The tunable factor N is to determine how far the system allows subscribers' batch processes to wait beyond a desired timeframe before the batch scheduler 410 prioritizes the batch processes above average.

In some alternative embodiments, the batch scheduler 410 may treat the overdue queue 402 as the top priority queue and the expedite queue 401 as having the second highest priority. Especially in situation where there are lots of expedite requests, the large amount of requests themselves can cause a starvation. The system needs to make sure that the expedite requests will not cause the majority of batch processes in the overdue queue 402 lapse for a long time. Alternatively, instead of swapping the priority order of the expedite queue 401 and the overdue queue 402, the batch scheduler 410 may choose to run some batch processes from the overdue queue 402 even when there are batch processes left in the expedite queue 401. For example, the batch scheduler 410 may choose to run an overdue batch process ignoring the priority order, if the overdue batch process has been overdue for a predetermined threshold (e.g., a value even larger than the adjusted overdue threshold N×SUM (DB)).

The queue having the third highest priority is the recently used queue 403. The recently used queue includes batch processes of subscribers who recently have used the system. In other words, the recently used queue includes batch processes of subscribers with TU<TB. The subscribers of batch processes in the recently used queue 403 are subscribers who are frequently using the system. The recently used queue 403 ensures a level of service for the frequent subscribers, by prioritizing the batch processes of the frequent subscribers ahead of the batch processes of the infrequent subscribers. When there is no batch processes left in the expedite or overdue queues, the batch scheduler 410 focuses on the recently used queue 403.

The queue having the lowest priority is called low priority queue 404 in FIG. 4. The low priority queue includes batch processes of other subscribers that are not included in the other three queues 401, 402 and 403. The system only handles batch processes in the low priority queue 404 when the other three priority queues are empty. The subscribers of batch processes in the low priority queue 404 do not use the system regularly and likely do not notice whether the system delays the batch processing. The low priority queue 404 ensures that even if a subscriber has not logged into the system or used the system recently, the batch process of that subscriber will eventually run. In some embodiments, the low priority queue 404 has a cutoff period. Any batch process that has not been performed for a time period longer than the cutoff period will be moved into the expedite queue or overdue queue to have more attention from the batch scheduler 410.

The batch scheduler 410 is triggered when each batch process is finished. As shown in FIGS. 3 and 4. The black dots 371-376 in FIG. 3 represent the time points when the batch scheduler 410 makes scheduling decisions. The batch scheduler 410 identifies the next batch process based on the scheduling decisions and instructs the batch scheduler 410 to perform the identified next batch process.

The batch scheduler 410 can proceed to a sleep mode when the batch processor 420 is handling the batch processes. Once the batch processor 420 finishes the steps as in blocks 422, 424 and 426, the batch processor 420 notifies the batch scheduler 420. The batch scheduler 410 wakes up from the sleep mode to trigger another scheduling decision.

At decision block 412, the batch scheduler 410 of the system first determines whether there are any expedite batch processes in the expedite queue 401. If there is no expedite batch processes in the expedite queue 401, the batch scheduler 410 moves to the next decision block 414. If there is one or more expedite batch processes in the expedite queue 401, the batch scheduler 410 identifies the oldest batch process left in the expedite queue 401. Then the batch scheduler 410 instructs the batch processor 420 to handle the identified batch process.

In response to the batch scheduler 410, the batch processor 420 at block 422 records the current metric TB for the subscriber of the identified batch process, i.e., the time elapsed since the last batch process commencement for the subscriber. At block 424, the batch processor 420 processes the identified batch process. After finishing the identified batch process, at block 426, the batch processor 420 records the current metric DB for the subscriber of the just finished batch process, i.e., the time duration of processing the just finished batch process. The metrics TB and DB for the subscriber are recorded for determine the priority queue for the next batch process requested by the subscriber. The metric DB is also used to calculate SUM(DB) for the next cycle.

At decision block 414, the batch scheduler 410 determines whether there are any overdue batch processes in the overdue queue 402. If there is no overdue batch processes in the overdue queue 402, the batch scheduler 410 moves to the next decision block 416. If there is one or more overdue batch processes in the overdue queue 402, the batch scheduler 410 identifies the oldest batch process left in the overdue queue 402. Then the batch scheduler 410 instructs the batch processor 420 to handle the identified batch process.

Similarly, at decision block 416, the batch scheduler 410 determines whether there are any batch processes of subscribers who recently have used the system in the recently used queue 403. If there is no such batch processes in the recently used queue 403, the batch scheduler 410 moves to the next decision block 418. If there is one or more such batch processes in the overdue queue 402, the batch scheduler 410 identifies the oldest batch process left in the recently used queue 403. Then the batch scheduler 410 instructs the batch processor 420 to handle the identified batch process.

At decision block 416, the batch scheduler 410 determines whether there are any low priority batch processes in the low priority queue 404. If there is no low priority batch processes left in the low priority queue 403, the batch scheduler 410 proceeds to check if there is any newly submitted batch process. If there is one or more low priority batch processes in the low priority queue 404, the batch scheduler 410 identifies the oldest batch process left in the low priority queue 402. Then the batch scheduler 410 instructs the batch processor 420 to handle the identified batch process.

Turning back to FIG. 3 which illustrates an example process using the four priority queues, there are five subscribers in the example illustrated in FIG. 3. However, there can be an arbitrary number of subscribers in other various embodiments. The white dots 321-327 represent the time points when the subscribers use the system. Using the information of the time points of white dots 321-327, the batch scheduler 410 can re-arrange batch processes in the four queues 401-404 and therefore readjusts the priority of the batch processes.

If there is no batch scheduler 410, the batch processes would not be prioritized. In that situation, the system may perform the batches processes based on the sequence of the previous cycle, as shown by the rectangles 306A-309A. Instead, with the help of the batch scheduler 410, the system ensures that a more important or urgent batch process will be handled in a prioritized manner.

For example, at the time point of black dot 371, the batch scheduler 410 decides that the batch process 306B of s4 should be the next batch process to run, because the subscriber s4 has requested to expedite the batch process at a previous time point represented by cross 341. After the batch processor 420 finishes the batch process 306B for the subscriber s4, the batch scheduler 410 needs to determine the next batch process to run.

Since there is no more batch process in the expedite queue 401, the batch scheduler 410 then looks into the overdue queue 402. After determining at this time point 372 there is no batch process in the overdue queue 402 whose TB>N× SUM(DB), the batch scheduler 410 looks into the recently used queue 403. At the time point 372, there are multiple batches processes of subscribers who recently used the system. The batch scheduler 410 determines the batch process 307B of subscriber s2 is the oldest batch process in the recently used queue 403 and decides to run the batch process 307B of subscriber s2.

At the time point 373, again the expedite queue 401 and the overdue queue 402 are empty. The next batch process in the recently used queue 403 is the batch process 308B of subscriber s3. (The batch processes of subscribers s2 and s4 have just been processed.) So the batch scheduler 410 decides to run the batch process 308B of subscriber s3.

Next at the time point 374, the batch scheduler 410 determines that there is an overdue batch process in the overdue queue 402: TB(s1)>N×SUM(DB). The previous batch process 301 of subscriber s1 is performed in the beginning of the last cycle as shown in FIG. 3. The time elapsed since last batch process commencement for subscriber s1 is more than the total cycle processing time times the factor N. Therefore, the batch scheduler 410 instructs the batch processor 420 to perform the batch process 309B of subscriber s1 next.

Then at the time point 375, the batch scheduler 410 determines that subscriber s2 has again used the system at time point 326 and the batch process of subscriber s2 is again the oldest batch process in the recently used queue 403. So the batch process 310B of subscriber s2 will run next.

At the time point 376, the batch scheduler 410 determines that the expedite queue 401, the overdue queue 402 and the recently used queue 403 are empty. The batch scheduler 410 then picks the batch process of subscriber s5 from the low priority queue 404 and instructs the batch processor 420 to perform the batch process 311B of subscriber s5.

As shown in FIG. 3, the usage patterns are important for the batch scheduler 410 to make the scheduling decisions. A system with a large number of subscribers can collect usage patterns of the subscribers and identifies the inactive or infrequent subscribers based on the metrics of the subscribers. The inactive or infrequency subscribers are treated with lower priority like in FIG. 3. However, the inactive or infrequent subscribers likely will not notice the difference due to their sparse usage patterns. This enables the system to focus on the more urgent tasks associated with active or frequent subscribers.

Note that although the example described above can involve scheduling batch processes for extract, transform and load (ETL) tasks, a person having ordinary skill in the art will readily appreciates that the prioritized scheduling method can be used to schedule processes or tasks other than ETL tasks in other embodiments.

The subscribers of the system can affect the scheduling prioritization decisions by various ways. For example, a subscriber can explicitly request expediting the submitted batch process through the user interface. The subscriber can use the system more often by, e.g., interacting with the system through the user interface, or background usage such as generating a report in the background or utilizing APIs of the system. In some embodiments, the subscribers may request to adjust the N factor as a way to adjust the level of service.

The system measures metrics internally and records, e.g., how long it takes for the subscribers to have their batch processing data come in, the batch process runs, the DB duration of the last batch process, the time elapse since the last process started (TB), etc. These metrics are for internal calculations within the system and are not subject to subscribers' dictation.

In some alternative embodiments, the N factor can be dynamically adjusted either by the batch scheduler 410 or a subscriber. For example, the batch scheduler 410 can dynamically adjust the N factor on the fly based on the load situation. When the batch scheduler 410 increases the value of the N factor, the batch scheduler effectively increases the time window for allowing running the batch processes from the recently used queue 403 to meet their DT target. On the other hand, when the batch scheduler 410 decreases the value of the N factor, the batch scheduler 410 may focus more on the overdue queue 402 because the load situation of the system causes a large number of overdue batch processes.

Figure 5:
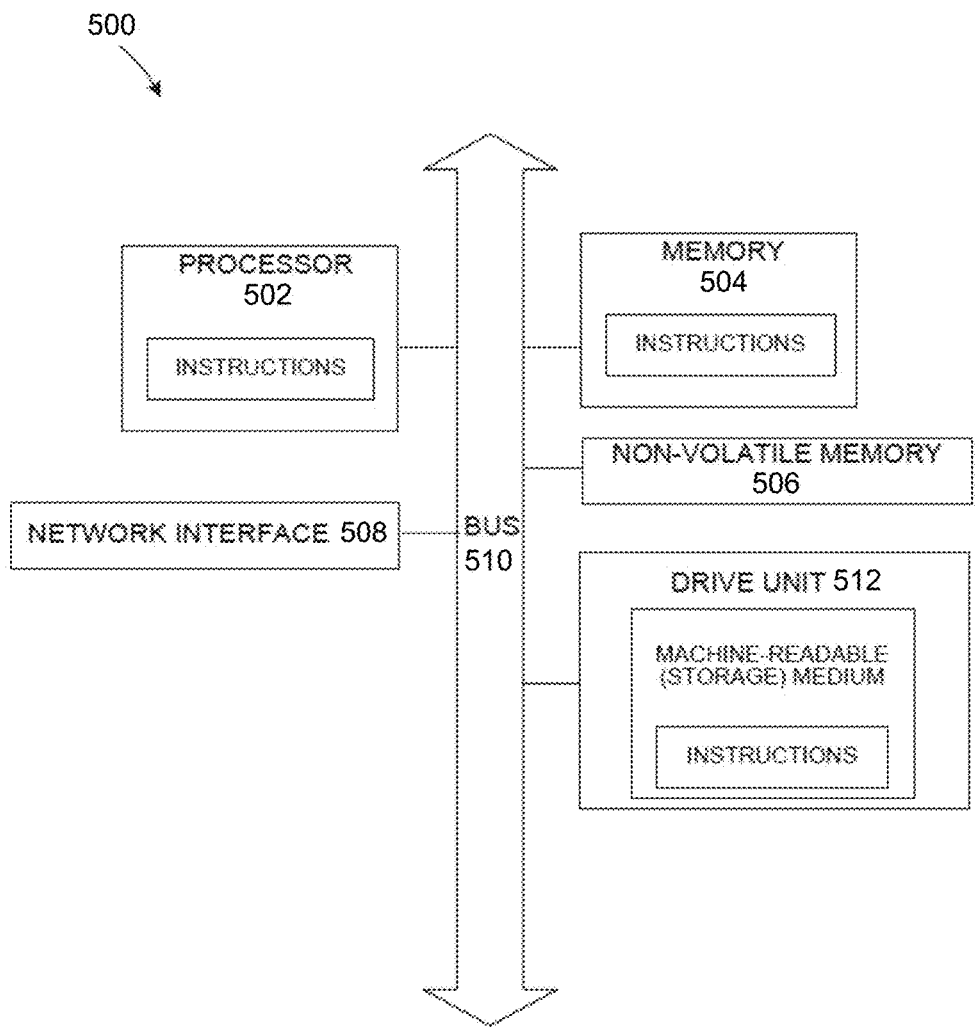
FIG. 5 is a diagrammatic representation of a machine in the example form of a computer system within which a set of instructions, for causing the machine to perform any one or more of the methodologies or modules discussed herein, may be executed.

FIG. 5 is a block schematic diagram that depicts a machine in the exemplary form of a computer system 500, within which a set of instructions for causing the machine to perform any of the herein disclosed methodologies (e.g., FIGS. 3-4) may be executed. For example, the computer system 500 can be, e.g., the task processing system 100 or a server of the task processing system or the batch scheduler 410 or the batch processor 420. In some embodiments, the computer system 500 may include a network router, a network switch, a network bridge, personal digital assistant (PDA), a cellular telephone, a Web appliance or any machine capable of executing or transmitting a sequence of instructions that specify actions to be taken. The computer system 500 is intended to illustrate a hardware device on which any of the instructions, processes, modules and components depicted in the figures above (and any other processes, techniques, modules and/or components described in this specification) can be implemented. As shown, the computer system 500 includes a processor 502, memory 504, non-volatile memory 506, and a network interface 508. Various common components (e.g., cache memory) are omitted for illustrative simplicity. The computer system 500 can be of any applicable known or convenient type, e.g., a personal computer (PC), server-class computer or mobile device (e.g., smartphone, card reader, tablet computer, etc.). The components of the computer system 500 can be coupled together via a bus and/or through any other known or convenient form(s) of interconnect(s).

One of ordinary skill in the relevant art will recognize that the terms "machine-readable (storage) medium" or "computer-readable (storage) medium" include any type of device that is accessible by the processor 502. The memory 504 is coupled to the processor 502 by, for example, a bus 510. The memory 504 can include, by way of example but not limitation, random access memory (RAM), e.g., dynamic RAM (DRAM) and static RAM (SRAM). The memory 504 can be local, remote, or distributed.

The bus 510 also couples the processor 502 to the non-volatile memory 506 and drive unit 512. The non-volatile memory 506 may be a hard disk, a magnetic-optical disk, an optical disk, a read-only memory (ROM), e.g., a CD-ROM, Erasable Programmable Read-Only Memory (EPROM), or Electrically Erasable Programmable Read-Only Memory (EEPROM), a magnetic or optical card, or another form of storage for large amounts of data. The non-volatile memory 506 can be local, remote, or distributed.

The data structures, modules, and instruction steps described in the figures above may be stored in the non-volatile memory 506, the drive unit 512, or the memory 504. The processor 502 may execute one or more of the modules stored in the memory components.

The bus 510 also couples the processor 502 to the network interface 508. The network interface 508 can include one or more of a modem or network interface. A modem or network interface can be considered to be part of the computer system 500. The network interface 508 can include an Ethernet card, a Bluetooth card, an optical fiber interface, a cable modem, a token ring interface, or other interfaces for coupling a computer system to other computer systems.

It is to be understood that embodiments may be used as or to support software programs or software modules executed upon some form of processing core (e.g., the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Some embodiments of the disclosure have other aspects, elements, features, and steps in addition to or in place of what is described above. These potential additions and replacements are described throughout the rest of the specification.

The invention claimed is:

1. A computer-implemented method of scheduling batch processing of a batch processing system, comprising:
   automatically recording subscriber usage events based on subscriber usage patterns collected in response to subscriber background usage, wherein said subscriber usage events are identified from any of subscriber interactions with the batch processing system when background usage for the subscriber occurs;
   recording a last job commencement event for a subscriber when the batch processing system starts processing a batch process for the subscriber;
   recording a last usage event for the subscriber when the subscriber uses the batch processing system; and
   where a first time period elapsed since the last usage event for the subscriber is less than a second time period elapsed since the last job commencement event for the subscriber, placing a next batch process of the subscriber into a recently used queue.

2. The computer-implemented method of claim 1, further comprising:
   recording the last job commencement of the subscriber when the batch processing system starts processing the identified batch process for the subscriber; and
   recording a time duration of a last batch process of the subscriber when the batch processing system finishes processing the identified batch process for the subscriber.

3. The computer-implemented method of claim 1, further comprising:
   determining that there is no batch process left in the recently used queue;
   identifying the oldest batch process from a low priority queue, the low priority queue having a lower priority than the recently used queue; and
   start processing the identified oldest batch process from the low priority queue.

4. The computer-implemented method of claim 1, further comprising:
   recording an expedite request event for the subscriber when the subscriber requests the batch processing system to expedite the next batch process of the subscriber;
   in response to the expedite request event for the subscriber, placing the next batch process of the subscriber into an expedite queue, the expedite queue having a higher priority than the recently used queue;
   identifying the next batch process of the subscriber as the oldest batch process from the expedite queue; and
   start processing the identified batch process for the subscriber.

5. The computer-implemented method of claim 4, wherein the subscriber requests the batch processing system to expedite the next batch process of the subscriber through a web browser user interface provided by the batch processing system.

6. The computer-implemented method of claim 1, further comprising:
   in an event that the time period elapsed since the last job commencement event for the subscriber is more than an adjusted overdue threshold, placing the next batch process of the subscriber into an overdue queue, the overdue queue having a higher priority than the recently used queue;
   identifying the next batch process of the subscriber as the oldest batch process from the overdue queue; and
   start processing the identified batch process for the subscriber.

7. The computer-implemented method of claim 6, wherein the adjusted overdue threshold equals a total cycle processing time times a limit factor, the total cycle processing time is the total time taken by the batch processing system to complete all batch processes of a last cycle, and the limit factor determines how far batch processes in the overdue queue are allowed to lapse before being processed.

8. The computer-implemented method of claim 7, further comprising:
   dynamically adjusting the limit factor based on the load situation of the batch processing system to change a time window for allowing running batch processes from the recently used queue.

9. The computer-implemented method of claim 7, further comprising:

receiving a request from the subscriber for adjusting a level of service for the subscriber; and adjusting the limit factor specifically for one or more batch processes of the subscriber in response to the request for adjusting the level of service for the subscriber.

10. The computer-implemented method of claim 1, wherein the subscriber uses the batch processing system by interacting with the batch processing system through a user interface provided by the batch processing system, or by executing a background usage task, or by interacting with the batch processing system through an application programming interface (API) provided by the batch processing system.

11. The computer-implemented method of claim 1, wherein the identified batch process for the subscriber is an extract, transform and load (ETL) process for data movement and transformation.

12. The computer-implemented method of claim 1, wherein the oldest batch process from the recently used queue is a batch process that has an earliest submission time among batch processes in the recently used queue.

13. A computer-implemented method of prioritizing batch processing based on user usage patterns, comprising:

automatically recording user usage events based on user usage patterns collected in response to user background usage, wherein said user usage events are identified from any of user interactions with the batch processing system when background usage for the user occurs;

determining, by a batch scheduler of a batch processing system, whether there are any overdue batch processes left in an overdue queue;

in response to the determination that there are overdue batch processes left in the overdue queue, instructing a batch processor of the batch processing system to start processing the oldest overdue batch process from the overdue queue; and completing the processing of batch processes in the overdue queue before undertaking processing of batch processes in a recently used queue.

14. The computer-implemented method of claim 13, further comprising:

identifying a batch process for a user wherein a time period elapsed since the user's last usage of the batch processing system is less than a time period elapsed since a last batch process commencement event for the user; and moving the identified batch process into the recently used queue by the batch scheduler.

15. The computer-implemented method of claim 13, further comprising:

identifying an overdue batch process for a user wherein a time period elapsed since a last batch process commencement event for the user is more than an overdue threshold.

16. The computer-implemented method of claim 15, wherein the overdue threshold depends on a total time taken by the batch processing system to complete all batch processes of a last cycle, and a limit factor determining how far batch processes in the overdue queue are allowed to lapse before being processed.

17. The computer-implemented method of claim 13, further comprising:

moving a batch process for a user into an expedite queue in response to a user request to expedite, the expedite queue having a higher priority than the overdue queue;

determining, by the batch scheduler, whether there are any expedite batch processes left in the expedite queue; and in response to the determination that there are expedite batch processes left in the expedite queue, instructing a batch processor to start processing the oldest expedite batch process from the expedite queue.

18. The computer-implemented method of claim 13, further comprising:

determining, by the batch scheduler, that there are no batch process left in the overdue queue and the recently used queue; and instructing the batch processor to start processing the oldest batch process from a low priority queue, the low priority queue having a lower priority than the overdue queue and the recently used queue.

19. A computing device, comprising:

a processor;

a user interface configured to interact with users of the computing device;

a batch scheduler module;

a memory storing executable instructions implementing the batch scheduler module which, when executed by the processor, is configured to perform the process of:

automatically recording user usage events based on user usage patterns collected in response to user background usage, wherein said user usage events are identified from any of user interactions with the batch processing system when background usage for the user occurs;

monitoring user usage events for the users of the computing device, recording batch process commencement events for the users and time durations of last batch processes for the users, determining that a time period elapsed since the last usage event for a second user is less than a time period elapsed since the last batch process commencement event for the second user, and moving a second batch process of the second user into a recently used queue.

20. The computing device of claim 19, wherein the process further includes steps of:

moving a third batch process of a third user into an expedite queue, in response to a request from the third user to expedite the third batch process; and start processing batch processes in an expedite queue before handling batch processes from the overdue queue and the recently used queue.

21. The computing device of claim 20, wherein the process further includes steps of:

moving batch processes that do not belong to the expedite queue, the overdue queue and the recently used queue into a low priority queue; and start processing batch processes from the low priority queue when the expedite queue, the overdue queue and the recently used queue are empty.

22. The computing device of claim 19, wherein the adjusted overdue threshold depends on a total time taken by the computing device to complete all batch processes of a last cycle, and a limit factor determining how far batch processes in an overdue queue are allowed to lapse before being processed.

* * * * *